(12) United States Patent
Nakao (10) Patent No.: US 7,801,179 B2
(45) Date of Patent: Sep. 21, 2010

(54) RADIO APPARATUS AND COMMUNICATION SYSTEM USING THE SAME

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1042 days.

(21) Appl. No.: 11/520,561

(22) Filed: Sep. 14, 2006

(65) Prior Publication Data

US 2007/0093216 A1 Apr. 26, 2007

Related U.S. Application Data

(60) Provisional application No. 60/716,495, filed on Sep. 14, 2005.

(51) Int. Cl.
*H04J 3/24* (2006.01)
(52) U.S. Cl. ..................................... 370/473
(58) Field of Classification Search ................. 375/355, 375/362, 358, 354, 371, 295; 370/473, 477, 370/480; 455/550.1, 101, 93; 381/71.11
See application file for complete search history.

(56) References Cited

U.S. PATENT DOCUMENTS

| 7,602,871 B2* | 10/2009 | Nakamori et al. ............ 375/355 |
| 7,697,463 B2* | 4/2010 | Tanaka ......................... 370/310 |
| 2005/0136933 A1 | 6/2005 | Sandhu et al. |
| 2005/0163236 A1 | 7/2005 | Hammerschmidt et al. |
| 2005/0164655 A1 | 7/2005 | Nakao et al. |
| 2006/0215733 A1* | 9/2006 | Pun ............................. 375/142 |

FOREIGN PATENT DOCUMENTS

| JP | 2006-178041 | 6/2006 |
| WO | WO 2005/006700 A1 | 1/2005 |
| WO | WO 2005/018180 A1 | 2/2005 |

OTHER PUBLICATIONS

International Search Report and Written Opinion of the International Searching Authority issued in corresponding International Patent Application No. PCT/JP2006/318224, dated Dec. 4, 2006.
Sinem Coleri, et al., "Channel Estimation Techniques Based on Pilot Arrangement in OFDM Systems," IEE Transactions on Broadcasting, Sep. 2002, pp. 223-229, vol. 48, No. 3.

* cited by examiner

*Primary Examiner*—Curtis Kuntz
*Assistant Examiner*—Hai Phan
(74) *Attorney, Agent, or Firm*—McDermott Will & Emery LLP (57) ABSTRACT

A control unit produces a packet signal formed by a plurality of streams. While using as a reference a first known signal assigned to one of the plurality of streams and performing a cyclic timing shift within the first known signal on a first known signal assigned to another stream, the control unit performs a timing shift on a second known signal and a control signal also. While setting the amount of timing shift to different values for the first known signal and the second known signal, the control unit sets the amount of timing shift in a manner that the timing shift amount for a control signal contained in the leading combination is equal to that for the first known signal while the timing shift amount for a control signal contained in each of the remaining combinations is equal to that for the second known signal.

5 Claims, 9 Drawing Sheets

| L-STF | L-LTF | L-SIG | HT-SIG | HT-STF | HT-LTF | -HT-LTF | HT-LTF | DATA 1 | DATA 2 -400ns | DATA 3 -200ns | DATA 4 -600ns | ... | HT-SIG | DATA N |
|---|---|---|---|---|---|---|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | HT-LTF -400ns | DATA 1 | DATA 2 -400ns | DATA 3 -200ns | DATA 4 -600ns | ... | HT-SIG -400ns | DATA N+1 -400ns |
| L-STF -100ns | L-LTF -100ns | L-SIG -100ns | HT-SIG -100ns | HT-STF -200ns | HT-LTF -200ns | -HT-LTF -200ns | HT-LTF -200ns | DATA 1 | DATA 2 -400ns | DATA 3 -200ns | DATA 4 -600ns | ... | HT-SIG -200ns | DATA N+2 -200ns |
| L-STF -150ns | L-LTF -150ns | L-SIG -150ns | HT-SIG -150ns | HT-STF -600ns | HT-LTF -600ns | -HT-LTF -600ns | HT-LTF -600ns | DATA 1 | DATA 2 -400ns | DATA 3 -200ns | DATA 4 -600ns | ... | HT-SIG -600ns | DATA N+3 -600ns |

FIG.3B

| HT-STF | HT-LTF | -HT-LTF | HT-LTF | DATA 1 | DATA 2 -400ns | DATA 3 -200ns | DATA 4 -600ns | HT-SIG | DATA 5 | DATA 6 -400ns | DATA 7 -200ns | DATA 8 -600ns | ... | HT-SIG | DATA N |
|---|---|---|---|---|---|---|---|---|---|---|---|---|---|---|---|
| HT-STF -400ns | HT-LTF -400ns | -HT-LTF -400ns | HT-LTF -400ns | DATA 1 | DATA 2 -400ns | DATA 3 -200ns | DATA 4 -600ns | HT-SIG -400ns | DATA 5 | DATA 6 -400ns | DATA 7 -200ns | DATA 8 -600ns | ... | HT-SIG -400ns | DATA N+1 -400ns |
| HT-STF -200ns | HT-LTF -200ns | -HT-LTF -200ns | HT-LTF -200ns | DATA 1 | DATA 2 -400ns | DATA 3 -200ns | DATA 4 -600ns | HT-SIG -200ns | DATA 5 | DATA 6 -400ns | DATA 7 -200ns | DATA 8 -600ns | ... | HT-SIG -200ns | DATA N+2 -200ns |
| HT-STF -600ns | HT-LTF -600ns | -HT-LTF -600ns | HT-LTF -600ns | DATA 1 | DATA 2 -400ns | DATA 3 -200ns | DATA 4 -600ns | HT-SIG -600ns | DATA 5 | DATA 6 -400ns | DATA 7 -200ns | DATA 8 -600ns | ... | HT-SIG -600ns | DATA N+3 -600ns |

FIG.3C

| L-STF | L-LTF | L-SIG | DATA |
|---|---|---|---|

RADIO APPARATUS AND COMMUNICATION SYSTEM USING THE SAME

RELATED APPLICATIONS

This application claims the benefit of U.S. Provisional Patent Application No. 60/716,495, filed on Sep. 14, 2005 the disclosure of which Application is incorporated by reference herein.

BACKGROUND OF THE INVENTION

1. Field of the Invention

The present invention relates to radio apparatuses, and it particularly relates to a radio apparatus using multiple subcarriers and a communication system utilizing said radio apparatus.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data to be transmitted in parallel in the packet signal is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. For the purpose of enhancing the transmission efficiency in this MIMO system, the data signals to be transmitted respectively in a plurality of packet signals are aggregated into a single packet packet. In so doing, the control signals are appended to the respective data signals. In other words, a plurality of combinations of control signals (hereinafter referred to as "MIMO control signals") and data signals are contained in the packet signals. In the case when the receiving apparatus receives these control signals and data signals, the weights and channel characteristics need to have been derived beforehand. Accordingly, the known signal in a MIMO system (hereinafter referred to as "MIMO known signals") are contained in the packet signals.

The compatibility with a system (hereinafter referred to as "legacy system"), which is not a MIMO system, is also required. In other words, it is required that the existence of packet signals be let known to a receiving apparatus of a legacy system. Accordingly, a known signal and a control signal for a legacy system (referred to as "legacy known signal" and "legacy control signal", respectively) are assigned to a header portion of a packet signal. If these are aggregated, the packet format will be composed of a legacy known signal, a legacy control signal, a MIMO control signal contained in a leading combination, a MIMO known signal, a data signal contained in the leading combination and the remaining combinations. Here, the remaining combinations are arranged sequentially in the order of a MIMO control signal and a MIMO data signal.

It is generally the case that the amount of information to be transmitted by the legacy control signal and the MIMO control signal (hereinafter these will be generically referred to as "control signal") is smaller than the amount of information to be transmitted by the data signal. Thus, it is possible that the control signal is transmitted by a single stream. However, if the control signal is assigned to a single stream but the signals other than the control signal are assigned to multiple streams, the power will differ only in part of the packet signal. To reduce such power fluctuation, the signals in which the control signal is subjected to cyclic timing shift in the period of control signal are assigned to the remaining streams. Such processing is generally called CDD (Cyclic Delay Diversity). To conform to the control signal, the legacy known signal and the MIMO known signal (hereinafter these will be generically referred to as "known signal") are also subjected to CDD.

As the amount of timing shift becomes larger, the effect of the delayed waves also grows. Hence, the receiving characteristics in the receiving apparatus compatible with the legacy system possibly deteriorate. Accordingly, in the light of compatibility with the legacy system, the smaller amount of timing shift is desired in CDD. On the other hand, as the amount of timing shift becomes smaller, the correlation among the multiple streams becomes larger, so that the separation of streams will be inadequate. Hence, in consideration of the characteristics in the MIMO system, the larger amount of timing shift is desired in CDD. Under these circumstances, CDD is applied to the legacy known signal, the legacy control signal and the MIMO control signal contained in a leading combination by using a relatively small absolute value for the amount of timing shift and, at the same time, CDD is applied to the MIMO known signal by using a relatively large absolute value for the amount of timing shift.

Under these circumstances, the inventor of the present invention came to recognize the following problems to be solved. As the amount of timing shift in a MIMO control signal, the same value as the amount of timing shift for a legacy known signal is set. As a result, CDD is implemented to a MIMO control signal contained in a leading combination by using the same value as the amount of timing shift in a legacy known signal assigned in a front part. However, the amount of timing shift in a MIMO control signal contained in the remaining combinations differs from the amount of timing shift in a MIMO known signal assigned to a front part. Accordingly, the weight estimated based on the MIMO known signal in a receiving apparatus may not be value suitable for receiving a MIMO control signal. Then, there may be cases where error is caused in the received MIMO known signal. Generally, the MIMO control signal contains more important information than the data signal.

SUMMARY OF THE INVENTION

The present invention has been made in view of the foregoing circumstances and a general purpose thereof is to provide a radio apparatus which enhances the possibility of accurately transmitting a second and the subsequent control signal when a plurality of combinations of control signal and data signal are transmitted.

In order to solve the above problems, a radio apparatus according to one embodiment of the present invention is a radio apparatus which transmits a packet signal composed of a plurality of streams, and the apparatus comprises: an input unit which inputs a plurality of combinations of control signal on a data signal and said data signal wherein the combination contains data signals which are to be assigned respectively to a plurality of streams; a generation unit which generates a packet signal in a manner such that while a first known signal is being assigned anterior to a control signal contained in a leading combination and a second known signal is being assigned posterior to said control signal, a data signal contained in the leading combination is assigned posterior to the second known signal and then the remaining combinations are assigned, posterior to said data signal, sequentially in the order of a control signal and a data signal among the plurality of combinations inputted by said input unit; and a transmitter which transmits the packet signal generated by the generation unit. While using as a reference a first known signal assigned to one of a plurality of streams and applying a cyclic timing shift within the first known signal to a first known signal assigned to another stream, the generation unit applies also a timing shift to the second known signal and the control signal, and while setting an amount of timing shift to different values for the first known signal and the second known signal, the generation unit sets an amount of timing shift in a manner that an amount of timing shift for a control signal contained in the leading combination is equal to that for the first known signal and an amount of timing shift for a control signal contained in each of the remaining combinations is equal to that for the second known signal.

According to this embodiment, the timing shift amount for a known signal assigned in front of a control signal is set as a timing shift amount for the control signal contained in each of a plurality of combinations. As a result, the degradation of characteristics in demodulating the control signal can be suppressed.

The generation unit applies also a cyclic timing shift to a data signal, and may set an amount of timing shift to different values for a control signal and a data signal contained in the leading combination and set an amount of timing shift in a manner that an amount of timing shift for control signals contained in the remaining combination is equal to that for data signals contained in the remaining combinations. In this case, the data signals can be demodulated.

The generation unit may set an amount of timing shift in a manner that the absolute value of a timing shift amount for the control signal contained in the remaining combinations is greater than the absolute value of a timing shift amount for the control signal contained in the leading combination. In such a case, the characteristics can be improved while the compatibility with the legacy system is maintained.

The radio apparatus may further comprise a selector which selects either a format to be generated by the generation unit or a format defined by another format and then causes the generation unit to generate a packet signal of the selected format. The generation unit may generate a packet signal as the another format in a manner such that, among the plurality of combinations inputted by the input unit, a control signal contained in the leading combination is assigned posterior to the second known signal, a data signal contained in the leading combination is assigned posterior to said control signal, and then the remaining combinations are assigned, posterior to said data signal, sequentially in the order of a control signal and a data signal, and the generation unit may set amounts of timing shift in a manner such that the amounts of timing shift for a control signal contained in the leading combination and for control signals contained in the remaining combinations are equal to the amount of signal contained in the second known signal. In this case, the another format is also produced which is defined in a manner such that a control signal contained in the leading combination is assigned posterior to the second known signal. Hence, the utilization efficiency of packet signals can be enhanced.

Another embodiment of the present invention relates to a communication system. This communication system comprises: a transmitting apparatus which transmits a packet signal composed of a plurality of streams; and a receiving apparatus which receives the packet signal transmitted from the transmitting apparatus. The transmitting apparatus includes: an input unit which inputs a plurality of combinations of control signal on a data signal and said data signal wherein the combination contains data signals which are to be assigned respectively to a plurality of streams; a generation unit which generates a packet signal in a manner such that while a first known signal is being assigned anterior to a control signal contained in a leading combination among the plurality of combinations inputted by the input unit and a second known signal is being assigned posterior to said control signal, a data signal contained in the leading combination is assigned posterior to the second known signal and then the remaining combinations are assigned, posterior to said data signal, sequentially in the order of a control signal and a data signal among the plurality of combinations inputted by the input unit; and a transmitter which transmits the packet signal generated by the generation unit. While using as a reference a first known signal assigned to one of a plurality of streams and applying a cyclic timing shift within the first known signal to a first known signal assigned to another stream, the generation unit applies also a timing shift to the second known signal and the control signal, and while setting an amount of timing shift to different values for the first known signal and the second known signal, the generation unit sets an amount of timing shift in a manner that an amount of timing shift for a control signal contained in the leading combination is equal to that for the first known signal and an amount of timing shift for a control signal contained in each of the remaining combinations is equal to that for the second known signal.

Data may be composed of a plurality of streams. A known signal may be composed of a plurality of streams. A control signal may be composed of a plurality of streams.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

An outline of the present invention will be given before a concrete description thereof. The embodiments of the present invention relate to a MIMO system comprised of at least two radio apparatuses. One of the radio apparatuses corresponds to a transmitting apparatus whereas the other corresponds to a receiving apparatus. The transmitting apparatus generates one packet signal in such a manner as to contain a plurality of combinations of control signal and data signal. Note that one packet signal is composed of a plurality of streams, or multiple streams. As mentioned earlier, if the amount of timing shift in a MIMO control signal contained in a second and the subsequent combinations differs from the amount of timing shift in a MIMO known signal, the probability of error occurrence in MIMO control signals will increase. Thus, the following processing will be carried out in the present embodiment.

The transmitting apparatus applies CDD to the MIMO control signal contained in a leading combination, by using the same amount of timing shift as that in a legacy known signal assigned anterior thereto. On the other hand, the transmitting apparatus applies CDD to MIMO control signals contained in the second and the subsequent combinations, by using the same amount of timing shift as that in the MIMO known signal assigned anterior thereto. In other words, the transmitting apparatus uses different values wherein the value of the amount of timing shift for the MIMO control signal contained in the leading combination differs from the values of the amounts of timing shift for the MIMO control signals contained in the second and the subsequent combinations, respectively. As a result, the degradation of the receiving characteristics for the MIMO control signals contained in the second and the subsequent combinations can be restricted while the compatibility with a legacy system and the characteristics in the MIMO system are being maintained.

Figure 1:
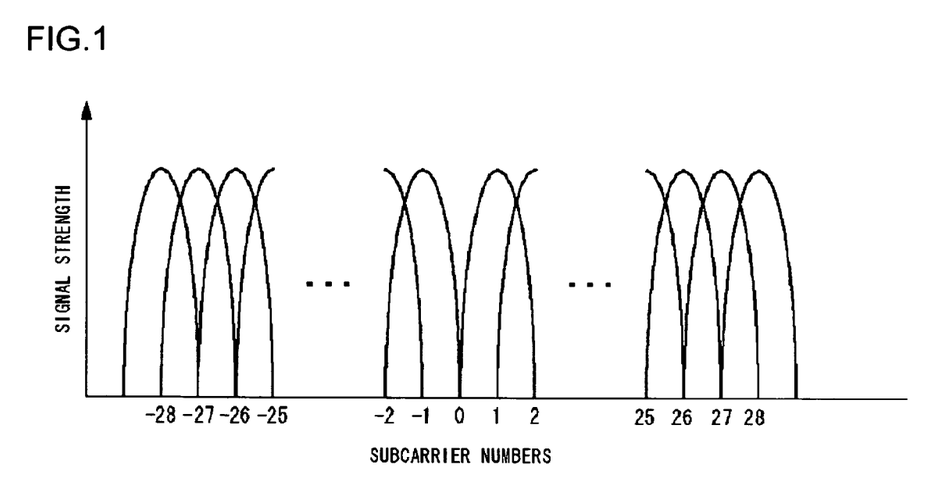
FIG. 1 illustrates a spectrum of a multicarrier signal according to an embodiment of the present invention.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a legacy system. One example of legacy systems is a wireless LAN complying with the IEEE802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" as mentioned earlier. As a result thereof, since the mode of modulation scheme, the coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the data rate will be 9 Mbps.

Figure 2:
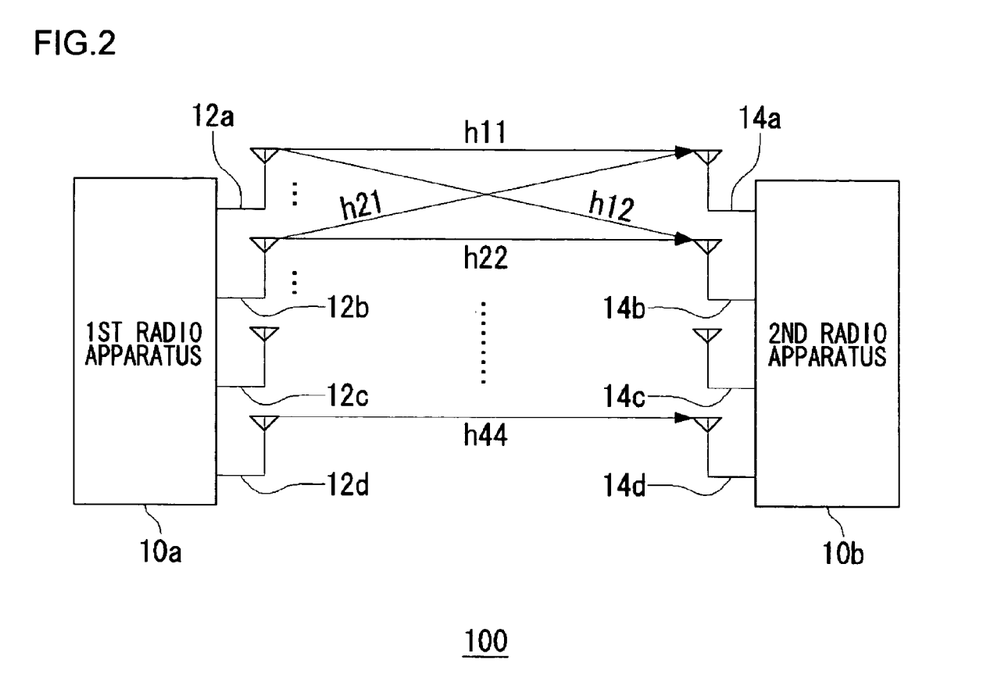
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12". The second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be explained before the description of a structure of the communication system 100. Assume herein that data are being transmitted from the first radio apparatus 10a to the second radio apparatus 10b. The first radio apparatus 10a transmits respectively the data of multiple streams from the first antenna 12a to the fourth antenna 12d, respectively. As a result, the data rate becomes higher. The second radio apparatus 10b receives the data of multiple streams by the first antenna 14a to the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna $12i$ to the jth antenna $14j$ is denoted by $h_{ij}$. In FIG. 2, the channel characteristic between the first antenna $12a$ and the first antenna $14a$ is denoted by $h_{11}$, that between the first antenna $12a$ and the second antenna $14b$ by $h_{12}$, that between the second antenna $12b$ and the first antenna $14a$ by $h_{21}$, that between the second antenna $12b$ and the second antenna $14b$ by $h_{22}$, and that between the fourth antenna $12d$ and the fourth antenna $14d$ by $h_{44}$. For the clarity of illustration, the other transmission channels are omitted in FIG. 2. Note that the roles of the first radio apparatus $10a$ and the second radio apparatus $10b$ may be reversed.

Figure 3A:
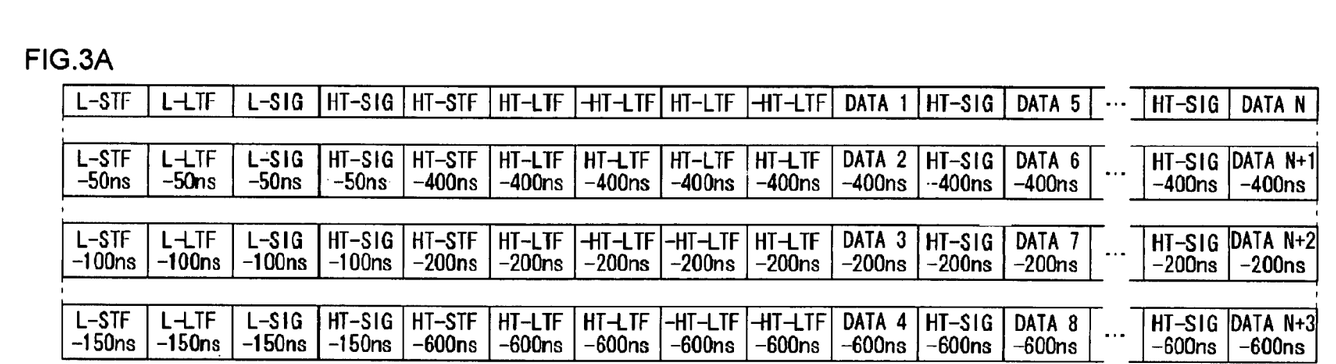
FIGS. 3A to 3C illustrate packet formats in a communication system shown in FIG. 2.
Figure 3B:
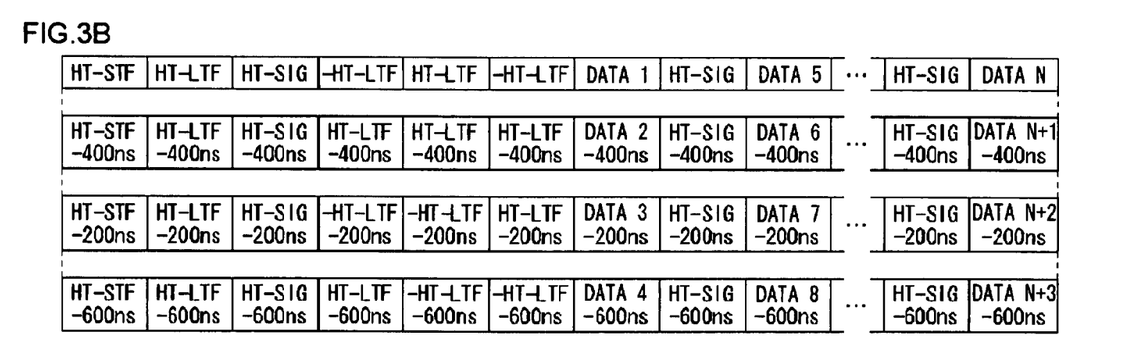
Figure 3C:
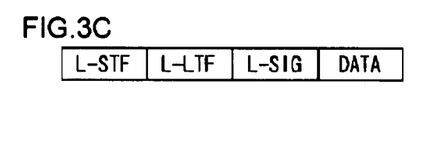

FIGS. 3A to 3C illustrate packet formats used by a communication system 100. FIGS. 3A and 3B correspond to a first packet format and a second packet format defined in a MIMO system, respectively, and FIG. 3C corresponds to a packet format defined in a legacy system. In FIG. 3A, data contained in four streams are to be transmitted, and the packet formats corresponding to the first stream to the fourth stream are shown in order from the top to the bottom, respectively. In the packet signal corresponding to the first stream, "L-STF", "HT-LTF" and so forth are assigned as preamble signals. "L-STF", "L-LTF" and "L-SIG" and "HT-SIG" correspond to a known signal for use with timing estimation compatible with a legacy system, a known signal for use with channel estimation compatible with a legacy system, a control signal compatible with a legacy system and a control signal compatible with a MIMO system, respectively. For example, information on data rates is contained in the control signal compatible with a MIMO system. "HT-STF" and "HT-LTF" correspond to a known signal for use with timing estimation compatible with a MIMO system and a known signal for use with channel estimation compatible with a MIMO system, respectively. "DATA 1" is a data signal.

In the packet signal corresponding to the second stream, "L-STF (−50 ns)", "HT-LTF (−400 ns)" and so forth are assigned as preamble signals. In the packet signal corresponding to the third stream, "L-STF (−100 ns)", "HT-LTF (−200 ns)" and so forth are assigned as preamble signals. In the packet signal corresponding to the fourth stream, "L-STF (−150 ns)", "HT-LTF (−600 ns)" and so forth are assigned as preamble signals. Here, "−400 ns" and the like indicate an amount of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, a cyclic timing shift with the delayed amount of −50 ns is applied to "L-STF" in "L-STF (−50 ns)". Here, it is assumed that the duration of one OFDM symbol is 80 ns.

The control signals for "DATA 1" to "DATA 4" are equivalent to "HT-SIG", "HT-SIG (−50 ns)", "HT-SIG (−100 ns)" and "HT-SIG (−150 ns)" which are assigned anterior to "DATA 1" to "DATA 4", respectively. Accordingly, the combination of "HT-SIG", "HT-SIG (−50 ns)", "HT-SIG (−100 ns)", "HT-SIG (−150 ns)" and "DATA 1" to "DATA 4" is called a "first combination". The amount of timing shift for HT-SIG in the first combination is set to the same values as the amount of timing shift for "L-STF" and "L-LTF". The amount of timing shift is set to different values between HT-SIG and DATA contained in the first combination.

In the first stream, HT-LFTs are arranged from the top thereof in the order of "HT-LTF", "-HT-LTF", "HT-LTF" and "-HT-LTF". Here, in this order, HT-LTFs are called "first component", "second component", "third component" and "fourth component", respectively, in all of four streams. A desired signal for the first stream is extracted at the receiving apparatus by carrying out an operation of "first component minus (−) second component plus (+) third component minus (−) fourth component" for the received signals of all the streams. By performing an operation of "first component+ second component+third component+fourth component" for the received signals of all the streams, desired signals for the second stream are extracted at the receiving apparatus. By performing an operation of "first component−second component−third component−fourth component" for the received signals of all the streams, desired signals for the third stream are extracted at the receiving apparatus. By performing an operation of "first component+second component−third component−fourth component" for the received signals of all the streams, desired signals for the fourth stream are extracted at the receiving apparatus. It is to be noted that the additions and subtractions are done by the vector operation.

The portions from "L-LTF" up to "HT-SIG1" and the like use "52" subcarriers in the same way as in a legacy system. Of "52" subcarriers, "4" subcarriers correspond to the pilot signals. On the other hand, the portions corresponding to "HT-LTF" and the like and the subsequent fields use "56" subcarriers. "HT-SIG", "HT-SIG (−400 ns)", "HT-SIG (−200 ns)" and "HT-SIG (−600 ns)" are assigned posterior to "DATA 1" to "DATA 4" in the first stream to the fourth stream, respectively, and "DATA 5" to "DATA 8" are assigned posterior to "HT-SIG", "HT-SIG (−400 ns)", "HT-SIG (−200 ns)" and "HT-SIG (−600 ns)", respectively.

Here, "HT-SIG", "HT-SIG (−400 ns)", "HT-SIG (−200 ns)" and "HT-SIG (−600 ns)" are control signals for "DATA 5" to "DATA 8" assigned posterior thereto. Accordingly, the combination of "HT-SIG", "HT-SIG (−400 ns)", "HT-SIG (−200 ns)" and "HT-SIG (−600 ns)" and "DATA 5" to "DATA 8" is called a "second combination". The same applies to "HT-SIG", "HT-SIG (−400 ns)", "HT-SIG (−200 ns)", "HT-SIG (−600 ns)" and "DATA N" to "DATA N+3" assigned in the rearmost part, and these are called "{(N+3)/4}-th combination". The amount of timing shift for HIT-SIG in the second and the subsequent combinations is set to a value identical to that for "HT-STF" and "HT-LTF". That is, the amount of timing shift for HT-SIG in the second and the subsequent combinations is set to a value different from that for HT-SIG in the first combination. The amount of timing shift is set to the same value among HT-SIGs and DATA contained in the "second combination" to the "{(N+3)/4}-th combination".

"L-STF", "L-LTF" and "L-SIG" in FIG. 3A are not assigned in FIG. 3B. That is, the signal by which to maintain the compatibility with a legacy system is not assigned in FIG. 3B. In the first stream of FIG. 3B, the same four "HT-LTFs" as those in FIG. 3A are assigned following "HT-STF", but "HT-SIG" is inserted between the first of the four "HT-LTFs", i.e., "HT-LTF" and the second thereof, i.e., "-HT-LTF". "DATA 1" is assigned posterior to the four "HT-LTFs". The signals where the CDD of "−400 ns", "−200 ns" and "−600 ns" is applied to the first stream are assigned to the second stream to the fourth stream, respectively. Here, the combination of "HT-SIG", which is assigned among "HT-LTFs" and the like, and "DATA 1" to "DATA 4" is called a "first combination".

The fields following "DATA 1" to "DATA 4" are the same as those in FIG. 3A, and therefore the "second combination" to the "{(N+3)/4}-th combination" are assigned there. Here, the amount of timing shift for "HT-SIG" in the first combination is also set to a value identical to the amount of timing shift for "HT-STF" and "HT-LTFs". That is, the amount of timing shift for "HT-SIG" in the second and the subsequent combinations is set to a value identical to the amount of timing shift for "HT-SIG" in the first combination. Similar to FIG. 3A, "L-STF", "L-LTF" and "L-SIG" are assigned in FIG. 3C. "DATA" is further assigned posterior to "L-SIG".

Figure 4:
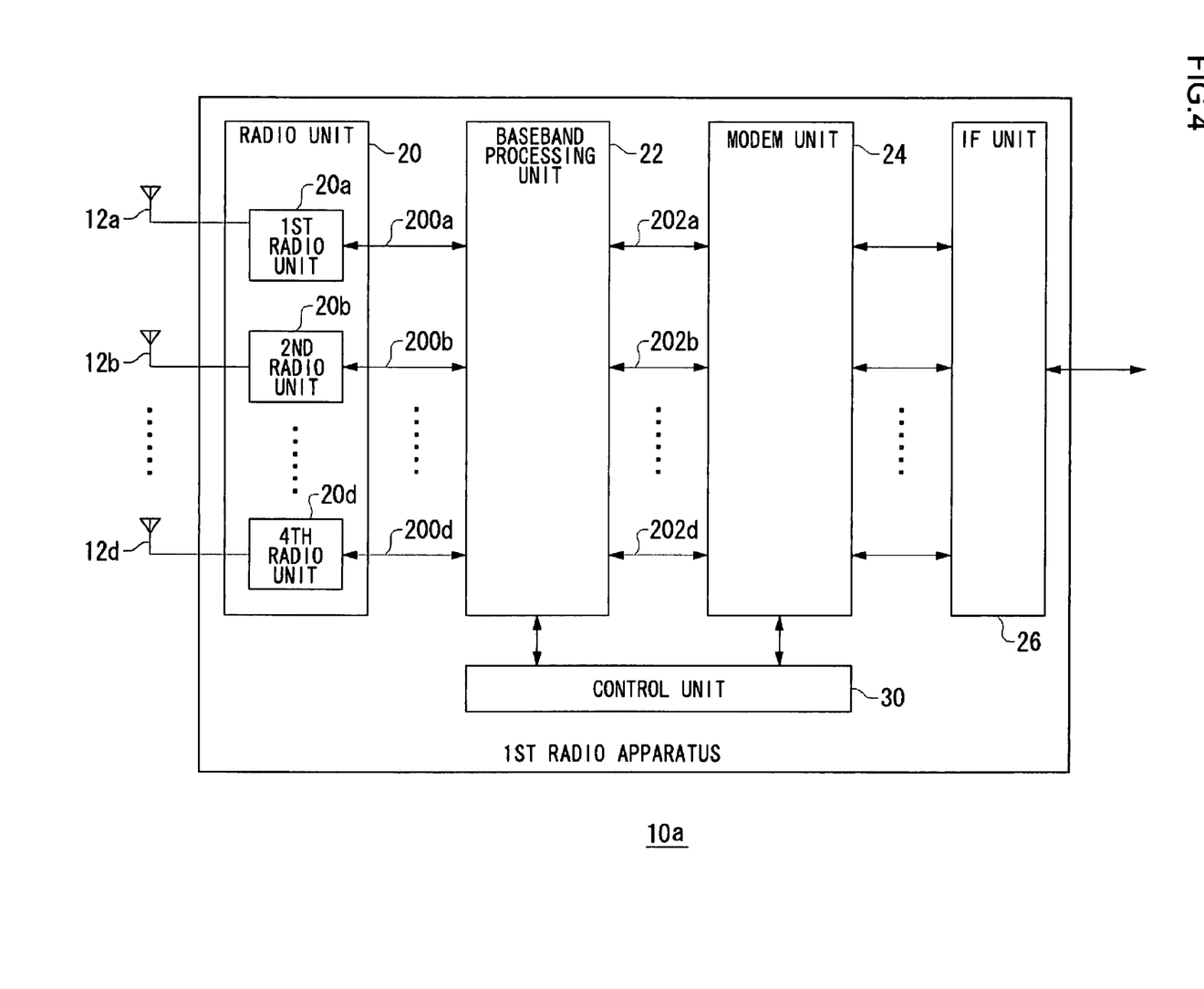
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
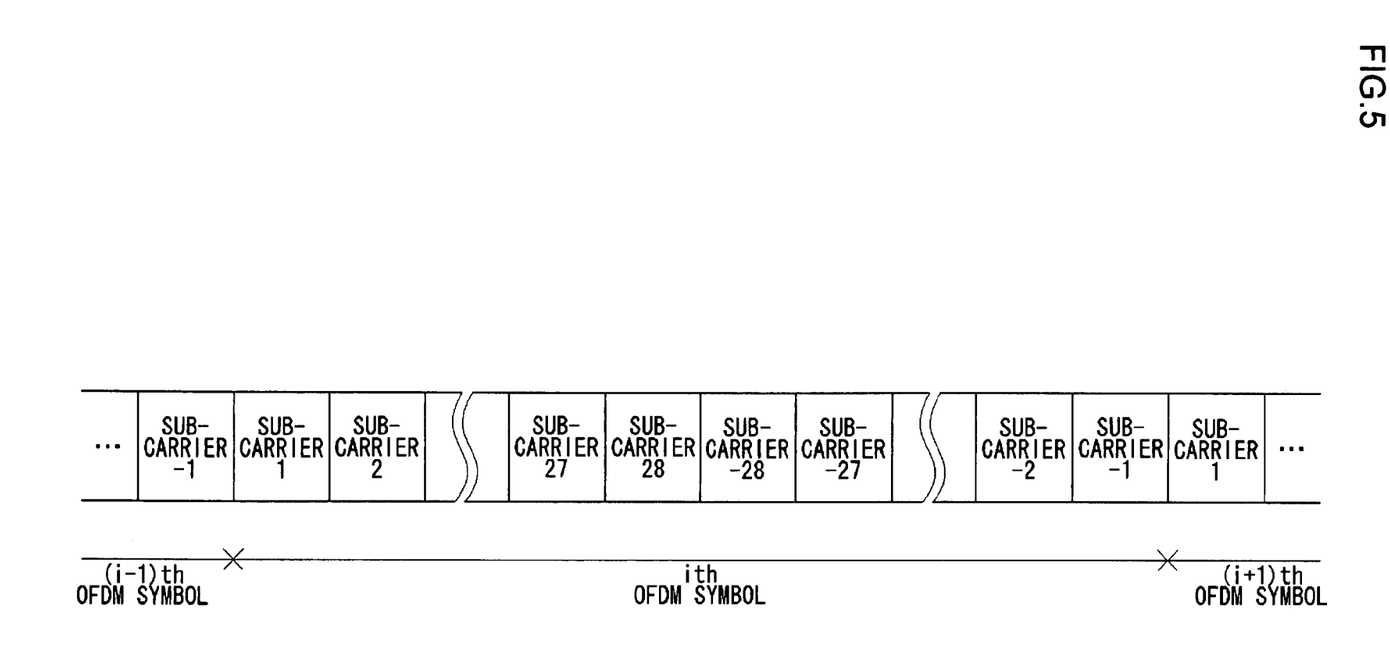
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i-1)"th OFDM symbol is placed before the "i"th OFDM symbol, and an "(i+1)"th OFDM symbol is placed after the "i"th OFDM symbol. Note that, in "L-SIG" or the like shown in FIG. 3A, a combination of "−26" to "26" is used for one "OFDM symbol".

Now refer back to FIG. 4. The baseband processing unit 22 performs CDD to generate packet signals corresponding to FIGS. 3A and 3B. CDD is performed as a matrix C expressed by the following Equation (1).

$$C(\lambda) = \mathrm{diag}(1, \exp(-j2\pi\lambda\delta/N\mathrm{out}), \Lambda, \exp(-j2\pi\lambda\delta (N\mathrm{out}-1)/N\mathrm{out})) \quad (1)$$

where δ indicates a shift amount and λ indicates the subcarrier number. The multiplication of C with streams is carried out per subcarrier. That is, the baseband processing unit 22 performs a cyclic time shifting within L-STS or the like on a stream-by-stream basis. The shift amount is set to a different value per stream to correspond to FIGS. 3A and 3B.

As a receiving processing, the modem unit 24 demodulates and decodes the frequency-domain signal 202 outputted from the baseband processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the baseband processing unit 22 as a frequency-domain signal 202. When the transmission processing is carried out, the modulation scheme and coding rate are specified by the control unit 30.

Here, the structure up to "L-SIG" is the same in both the first packet format defined in a MIMO system of FIG. 3A and the packet format defined in a legacy system of FIG. 3C (hereinafter referred to as "legacy format"). On the other hand, "HT-SIG" is assigned immediately after "L-SIG" in the first packet format whereas "DATA" is assigned immediately after "L-SIG" in the legacy format. Here, the constellation in "DATA" differs from that in "HT-SIG".

In cooperation with the control unit 30 described later, in a receiving processing the modem unit 24 detects the presence of "HT-STF" by demodulating "HT-SIG" in the frequency-domain signal 202. That is, if, among the packet signals demodulated by the modem unit 24, the constellation in a part posterior to "L-SIG" corresponds to the constellation in "HT-SIG", it is determined by the control unit 30 that the presence of "HT-SIG" has been detected. To explain the aforementioned operation, a description of the constellation of "HT-SIG" and the like will be given with reference to FIGS. 6A and 6B.

Figure 6A:
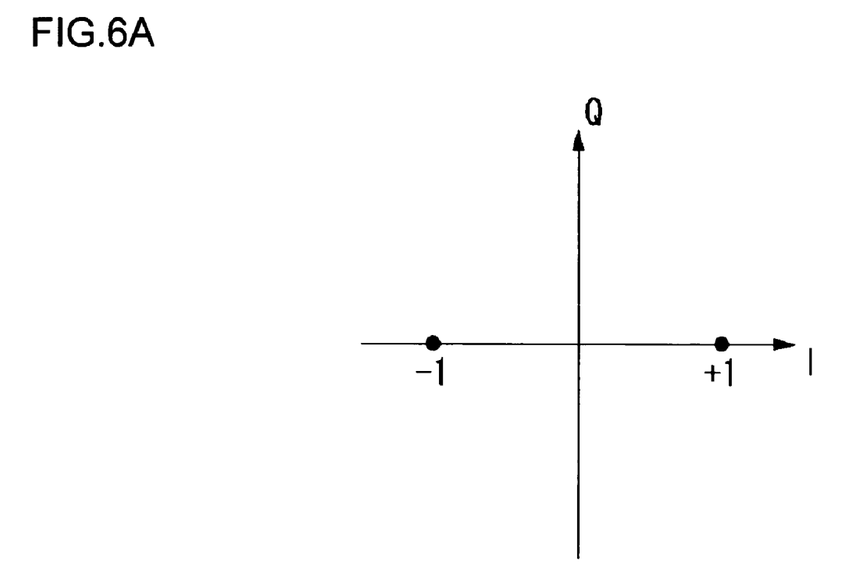
FIGS. 6A and 6B illustrate constellations of L-SIG and HT-SIG shown in FIGS. 3A to 3C.
Figure 6B:
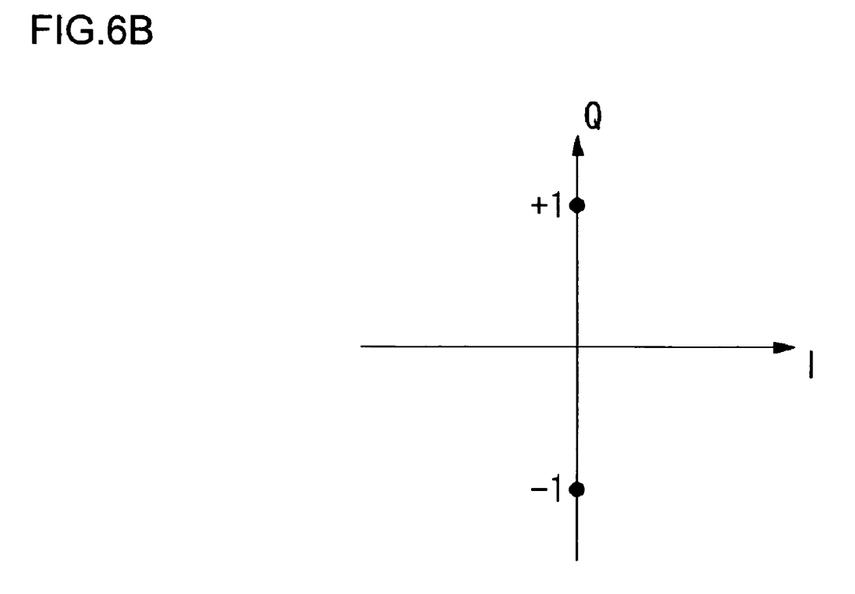

FIGS. 6A and 6B illustrate constellations of L-SIG and HT-SIG. FIG. 6A shows a constellation defined for L-SIG. The horizontal axis indicates an in-phase axis (hereinafter referred to as "I axis") and the vertical axis an orthogonal axis (hereinafter referred to as "Q axis"). Referring to FIG. 6A, a signal point is placed on "+1" or "−1" on the I axis. FIG. 6B shows a constellation defined for HT-SIG. Referring to FIG. 6B, a signal point is placed on "+1" or "−1" on the Q axis, and this placement is orthogonal to the constellation defined for L-SIG.

That is, if HT-SIG is assigned posterior to L-LTF or HT-LTF, namely, if the signal of the constellation shown in FIG. 6B is assigned, then it will be specified by the control unit 30 that the packet signal is of the second packet format. On the other hand, if HT-SIG is not assigned posterior to L-LTF or HT-LTF, it will be specified by the control unit 30 that the packet signal is of the first packet format or the legacy format. The control unit 30 makes a distinction between the first packet format and the legacy format in the following manner.

In the first packet format, HT-SIG is assigned posterior to L-SIG. However, in the legacy format, HT-SIG is not assigned posterior to L-SIG. Accordingly, the control unit 30 specifies, from a change in the constellation of demodulated BPSK, whether HT-SIG is assigned posterior to L-SIG or not. For data in the legacy format, there is a possibility that QPSK and 16-QAM may be used besides BPSK shown in FIG. 6A. In BPSK and 16-QAM, too, the signal point has a predetermined point on the I axis, as different from FIG. 6B. Thus, the control unit 30 can specify whether HT-SIG is assigned posterior to L-SIG or not, by checking on the value of demodulated signal point on the I axis. If HT-SIG is transmitted, the modulation scheme for the L-SIG part will be BPSK. If the packet signal compatible with a legacy system is received, the modulation scheme of this part should be BPSK and the values of Q components will be small. If, on the other hand, HT-SIG is received, the values of Q components will be large. With this ingenuity, the accuracy in the auto-detection of HT-SIG is raised. Now refer back to FIG. 4.

As a receiving processing, the IF unit 26 combines signals outputted from a plurality of modem units 24 and then forms one data stream. Then the IF unit 26 decodes the one data stream. The IF unit 26 outputs the demodulated data stream. As a transmission processing, the IF unit 26 inputs one data stream, encodes it and then separates it. A plurality of combinations of HT-SIG, which is a control signal on DATA, and said data are contained in the data stream wherein the plurality of combinations contain data which are to be assigned respectively to a plurality of streams. Then the IF unit 26 outputs the thus separated data to a plurality of modem units 24. It is assumed that the coding rate is specified by the control unit 30 at the time of transmission processing. Here, an example of the coding is convolutional coding, whereas an example of decoding is Viterbi decoding.

The control unit 30 controls the timing and the like of the first radio apparatus 10*a*. The control unit 30 generates packet signals formed by a plurality of streams as shown in FIGS. 3A and 3B while cooperating with the IF unit 26, the modem unit 24 and the baseband processing unit 22. Though the control unit 30 can produce a packet signal as shown in FIG. 3C, the description thereof is omitted here. Now the description is given here of a case when a packet signal in the first packet format shown in FIG. 3A is generated. Among a plurality of combinations, the control unit 30 assigns L-STF and L-LTF to a position anterior to HT-SIG contained in a leading combination, and assigns HT-STF and HT-LTF to a position posterior to said HT-STF. The control unit 30 assigns Data contained in the leading combination to a position posterior to HT-LTF, and then assigns sequentially the remaining combinations to a position posterior to said Data, in the order of HT-SIG and Data.

While using L-STF assigned to the first stream as a reference, the control unit 30 applies a cyclic timing shift within L-STF to L-STF assigned in the other streams. That is, the control unit 30 executes CDD and sets a different value of timing shift amount for each stream. The control unit 30 also applies CDD to L-STF, L-SIG, HT-SIG, HT-STF and HT-LTF. Here, the amounts of timing shift for HT-SIG contained in the first combination, L-STF, L-LTF and L-SIG are defined to be −50 ns, −100 ns and −150 ns, respectively. On the other hand, the amounts of timing shift for HT-SIG contained in the second and subsequent combinations, HT-STF, HT-LTF are defined to be −400 ns, −200 ns and −600 ns, respectively.

That is, while setting an amount of timing shift to different values for L-LTF and the like and HT-LTF and the like, the control unit 30 sets an amount of timing shift in a manner that an amount of timing shift for HT-SIG contained in the leading combination is equal to that for L-LTF. In particular, the amount of timing shift is set in a manner that the absolute value of a timing shift amount for L-LTF and the like is smaller than the absolute value of a timing shift amount for HT-LTF and the like. Hence, the compatibility with a legacy system is maintained in L-LTF and the like and the characteristics of a MIMO system is improved by HT-LTF and the like. The control unit 30 sets the amount of timing shift to the same value between HT-LTF and HT-SIG contained in the remaining combinations. That is, the control unit 30 sets the amount of timing shift in a manner that the absolute value of a timing shift amount for HT-SIG contained in the leading combination is smaller than the absolute value of a timing shift amount for HT-SIG contained in the remaining combinations. The control unit 30 instructs the processing according to the above setting, to the modem unit 24 and the baseband processing unit 22. The control unit 30 sets the amount of timing shift to different values between HT-SIG and Data contained in the first combination, and set it to the same value between HT-SIG and Data contained in the remaining combinations.

As a result of the amounts of timing shift defined as above, HT-SIG contained in the first combination is demodulated based on L-LTF assigned anterior thereto but the amounts of timing shift for both these fields are the same, so that degradation in demodulation characteristics can be restricted. HT-SIG contained in the second combination is demodulated based on HT-LTF assigned anterior thereto but the amounts of timing shift for both these fields are the same, so that degradation in demodulation characteristics can be restricted. Here, "demodulated based on L-LTF" and "demodulated based on HT-LTF" mean that the demodulation is carried out by the estimation of weight vectors in the baseband processing unit 22 and the channel estimation in the modem unit 24. As a result thereof, HT-SIGs contained respectively in a plurality of combinations are accurately demodulated and therefore the processings of data following these are done accurately to a certain degree. Hence, the radio apparatus 10 can enhance the receiving characteristics.

Now a description is given of a case where the packet signals in the second packet format are produced. The control unit 30 assigns HT-SIG contained in the leading combination among a plurality of combinations, to a position posterior to the first HT-LTF, and assigns the remaining HT-LTFs and the like to a position posterior to said HT-SIG. The control unit 30 assigns Data to a position posterior to them, and then assigns sequentially the remaining combinations to a position posterior to said Data, in the order of HT-SIG and Data. Here, the control unit 30 sets the amount of timing shift in a manner that the amounts of timing shift for HT-SIG contained in the leading combination and HT-SIGs in the remaining combinations are each equal to the amount of timing shift for HT-STF and HT-LTF. That is, the amounts of timing shift for the second to the fourth stream are defined respectively by −400 ns, −200 ns and −600 ns only.

The control unit 30 receives instructions from a user via an interface (not shown) and selects the use of either the first packet format or the second packet format, based on the received instructions. Alternatively, the control unit 30 checks the format of packet signals received via the radio unit 20, the baseband processing unit 22 and the modem unit 24. More specifically, the control unit 30 checks if "L-STF", "L-LTF" and "L-SIG" are assigned in a header portion of a packet signal. In other words, the control unit 30 checks if the first packet format or legacy format is used. For example, the baseband processing unit 22 and so forth store the patterns of "L-STF" and "L-LTF" beforehand, and compute the values of correlation between a received packet signal and the patterns stored. If a correlation value gets larger than a threshold value, it will be determined by the control unit 30 that "L-STF" and "L-LTF" are assigned.

If a packet signal of the first packet format or a packet signal of the legacy format is detected over a predetermined period of time, the control unit 30 selects the use of the first packet format at the time of transmission. That is, when it is detected that the first packet format or legacy format is being used, it is assumed that radio apparatuses of legacy system exist in the vicinity. Hence, the first packet format is used to maintain the compatibility with those. If, on the other hand, a packet signal of the first packet format or a packet signal of the legacy format is not detected over a predetermined period of time, the control unit 30 selects the use of the second packet format at the time of transmission. In this case, it is assumed contrary to the above state that no radio apparatus of legacy system exists in the vicinity. Hence, the second packet format with high utilization efficiency is used.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 7:
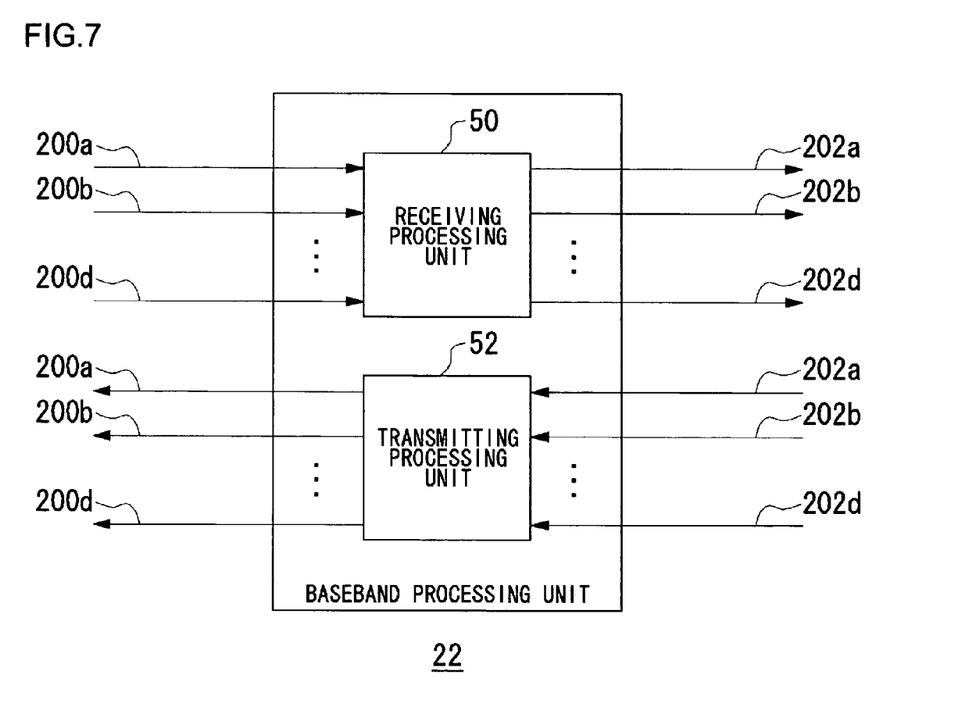
FIG. 7 illustrates a structure of a baseband processing unit shown in FIG. 4.

FIG. 7 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and, for that purpose, derives receiving weight vectors in the frequency domain. Then the receiving processing unit 50 outputs the result of array synthesis as the frequency-domain signal 202.

The transmitting processing unit 52 executes a part, corresponding to a transmission operation, of operations by the baseband processing unit 22. That is, the transmitting processing unit 52 converts the frequency-domain signals 202 so as to generate the time-domain signals 200. The transmitting processing unit 52 associates a plurality of streams respectively with a plurality of antennas 12. The transmitting processing unit 52 also executes CDD as shown in FIGS. 3A and 3B. Finally, the transmitting processing unit 52 outputs the time-domain signals 200.

Figure 8:
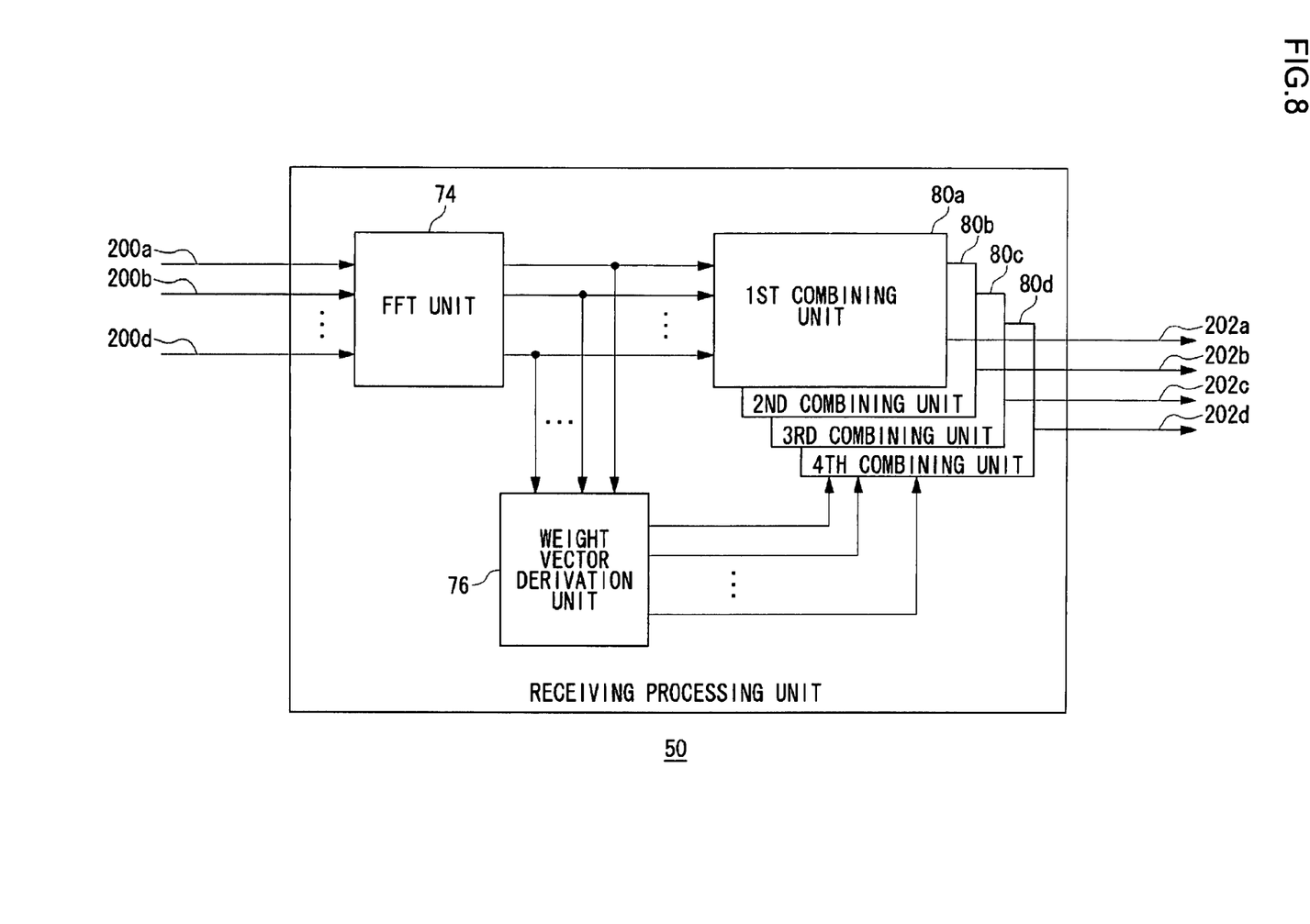
FIG. 8 illustrates a structure of a receiving processing unit shown in FIG. 7.

FIG. 8 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 5. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used to derive a weight vector corresponding to each of a plurality of streams. To derive the weight vector, an adaptive algorithm may be used or a channel characteristics may be used. Since a known technique may be employed in such processing, the explanation thereof is omitted here. As described earlier, when deriving the weights, the weight vector derivation unit 76 carries out an operation of "the first component−the second component+the third component−the fourth component". As described earlier, the weights are finally derived per subcarrier, per antenna 12 and per stream.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplier is to be executed, a value corresponding to one subcarrier is selected from among the frequency-domain values converted by the FFT unit 74. The selected value contains a value corresponding to each antenna 12. Note that both the selected weight and the selected value belongs to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The second combining unit 80b to the fourth combining unit 80d carries out the similar processing so as to derive data corresponding respectively to the second to fourth streams. The derived first to fourth streams are outputted as the first frequency-domain signal 202a to the fourth frequency-domain signal 202d, respectively.

Figure 9:
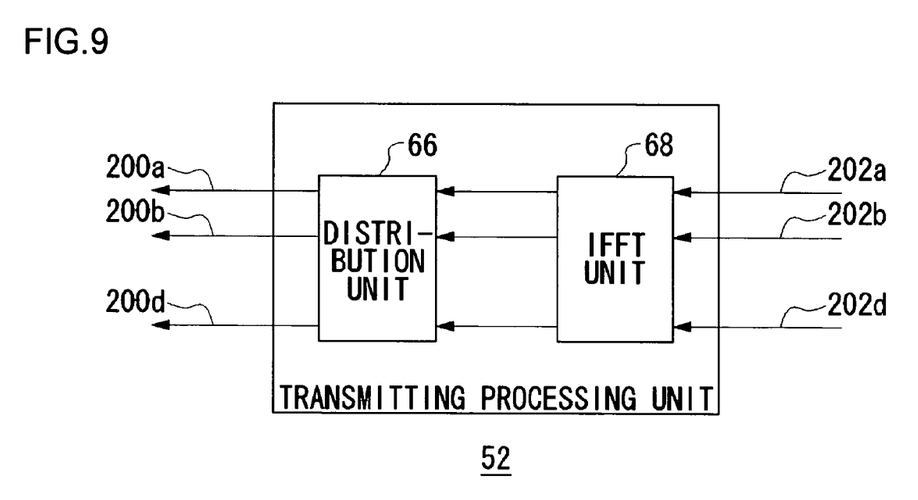
FIG. 9 illustrates a structure of a transmitting processing unit shown in FIG. 7.

FIG. 9 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. Since it is assumed here that the number of antennas 12 used is identical to the number of streams, each stream is directly associated with each antenna 12. The distribution unit 66 applies CDD to the streams to be transmitted, namely, "L-SIG" and the like among the respective packet signals.

An operation of the radio apparatus 10 structured as above will now be described. By checking the format of the packet signals received via the radio unit 20, the baseband processing unit and modem unit 24, the control unit 30 estimates whether or not there exists any radio apparatus of legacy system in the vicinity. If it is estimated that the radio apparatus of legacy system exists in the vicinity, the control unit 30 will decide on the use of the first packet format. If it is estimated that the radio apparatus of legacy system does not exist in the vicinity, the control unit 30 will decide on the use of the second packet format. When using the first packet format, the baseband processing unit 22 applies CDD to the fields in a manner such that the amount of timing shift for L-STF, L-LTF, L-SIG and HT-SIG contained in the leading combination and the amount of timing shift for HT-STF, TH-LTF and HT-SIG contained in the second and the subsequent combinations are set to different values. On the other hand, when using the second packet format, the baseband processing unit 22 applies CDD to the fields in a manner such that the amounts of timing shift for HT-STF, HT-LTF and HT-SIG contained in all the combinations are all set to the same value.

According to the present embodiments, the amount of timing shift for a known signal assigned immediately before HT-SIG is set as the amount of timing shift for said HT-SIG contained in each of a plurality of combinations. Thus, the degradation of characteristics in demodulating HT-SIG can be suppressed. The amount of timing shift for HT-SIG contained in the leading combination is set to the same value as that of the amount of timing shift for L-STF and L-LTF. As a result, the degradation of characteristics in demodulating HT-SIG can be suppressed while the compatibility with the legacy system is maintained. Since the amount of timing shift for HT-SIG contained in the remaining combinations is set to the same value as that of the amount of timing shift for HT-STF and HT-LTF, the degradation of characteristics in demodulating HT-SIG can be suppressed while the characteristics of a MIMO system is improved.

The amount of timing shift is set in a manner that the absolute value of a timing shift amount for HT-SIG contained in the remaining combinations is greater than the absolute value of a timing shift amount for a control signal contained in the leading combination. This allows improving the characteristics of a MIMO system while maintaining the compatibility with a legacy system. Since another packet format that does not contain L-STF and the like is also produced, the utilization efficiency of packet signals can be raised. Furthermore, the packet signals are used by selecting the packet format containing L-STF and the like or the packet format not containing L-STF and the like, so that either the compatibility with a legacy system or the increased utilization efficiency can be selected.

Different amount values of timing shift amounts are set to the packet formats that contain L-STF and the like and those that do not contain them, respectively. Hence, the degradation in demodulating HT-SIG can be suppressed even when the packet formats differ. Either the packet format containing L-STF and the like or the packet format not containing them is selected depending on whether or not there exists a radio apparatus of a legacy system in the vicinity, so that the packet format can be used according to the surrounding environment.

The present invention has been described based on the embodiments. These embodiments are merely exemplary, and it is understood by those skilled in the art that various modifications to the combination of each component and process thereof are possible and that such modifications are also within the scope of the present invention.

According to the embodiments of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus for transmitting a packet signal composed of a plurality of streams, the apparatus comprising:

an input unit which inputs a plurality of combinations of control signal on a data signal and said data signal wherein the combination contains data signals which are to be assigned respectively to a plurality of streams;

a generation unit which generates a packet signal in a manner such that while a first known signal is being assigned anterior to a control signal contained in a leading combination and a second known signal is being assigned posterior to said control signal, a data signal contained in the leading combination is assigned posterior to the second known signal and then the remaining combinations are assigned, posterior to said data signal, sequentially in the order of a control signal and a data signal among the plurality of combinations inputted by said input unit; and a transmitter which transmits the packet signal generated by said generation unit, wherein while using as a reference a first known signal assigned to one of a plurality of streams and applying a cyclic timing shift within the first known signal to a first known signal assigned to another stream, said generation unit applies also a timing shift to the second known signal and the control signal, and wherein while setting an amount of timing shift to different values for the first known signal and the second known signal, said generation unit sets an amount of timing shift in a manner that an amount of timing shift for a control signal contained in the leading combination is equal to that for the first known signal and an amount of timing shift for a control signal contained in each of the remaining combinations is equal to that for the second known signal.

2. A radio apparatus according to claim 1, wherein said generation unit applies also a cyclic timing shift to a data signal, and sets an amount of timing shift to different values for a control signal and a data signal contained in the leading combination and sets an amount of timing shift in a manner that an amount of timing shift for control signals contained in the remaining combination is equal to that for data signals contained in the remaining combinations.

3. A radio apparatus according to claim 1, wherein said generation unit sets an amount of timing shift in a manner that the absolute value of a timing shift amount for the control signal contained in the remaining combinations is greater than the absolute value of a timing shift amount for the control signal contained in the leading combination.

4. A radio apparatus according to claim 1, further comprising a selector which selects either a format to be generated by said generation unit or a format defined by another format and then causes said generation unit to generate a packet signal of the selected format, wherein said generation unit generates a packet signal as the another format in a manner such that, among the plurality of combinations inputted by said input unit, a control signal contained in the leading combination is assigned posterior to the second known signal, a data signal contained in the leading combination is assigned posterior to said control signal, and then the remaining combinations are assigned, posterior to said data signal, sequentially in the order of a control signal and a data signal, and wherein said generation unit sets amounts of timing shift in a manner such that the amounts of timing shift for a control signal contained in the leading combination and for control signals contained in the remaining combinations are equal to the amount of signal contained in the second known signal.

5. A communication system, comprising:

a transmitting apparatus which transmits a packet signal composed of a plurality of streams; and a receiving apparatus which receives the packet signal transmitted from said transmitting apparatus, said transmitting apparatus including:

an input unit which inputs a plurality of combinations of control signal on a data signal and said data signal wherein the combination contains data signals which are to be assigned respectively to a plurality of streams;

a generation unit which generates a packet signal in a manner such that while a first known signal is being assigned anterior to a control signal contained in a leading combination among the plurality of combinations inputted by the input unit and a second known signal is being assigned posterior to said control signal, a data signal contained in the leading combination is assigned posterior to the second known signal and then the remaining combinations are assigned, posterior to said data signal, sequentially in the order of a control signal and a data signal among the plurality of combinations inputted by said input unit; and a transmitter which transmits the packet signal generated by said generation unit, wherein while using as a reference a first known signal assigned to one of a plurality of streams and applying a cyclic timing shift within the first known signal to a first known signal assigned to another stream, said generation unit applies also a timing shift to the second known signal and the control signal, and wherein while setting an amount of timing shift to different values for the first known signal and the second known signal, said generation unit sets an amount of timing shift in a manner that an amount of timing shift for a control signal contained in the leading combination is equal to that for the first known signal and an amount of timing shift for a control signal contained in each of the remaining combinations is equal to that for the second known signal.

* * * * *